Dec. 29, 1964      B. LEIBINGER      3,163,068
PUNCH GUIDE FOR NIBBLING MACHINE
Original Filed Oct. 29, 1958      4 Sheets-Sheet 1

INVENTOR.
Berthold Leibinger
BY
Michael S. Striker
Attorney

Dec. 29, 1964    B. LEIBINGER    3,163,068
PUNCH GUIDE FOR NIBBLING MACHINE
Original Filed Oct. 29, 1958    4 Sheets-Sheet 2

INVENTOR.
Berthold Leibinger
BY
Michael S. Striker
Attorney

Dec. 29, 1964    B. LEIBINGER    3,163,068
PUNCH GUIDE FOR NIBBLING MACHINE
Original Filed Oct. 29, 1958    4 Sheets-Sheet 3
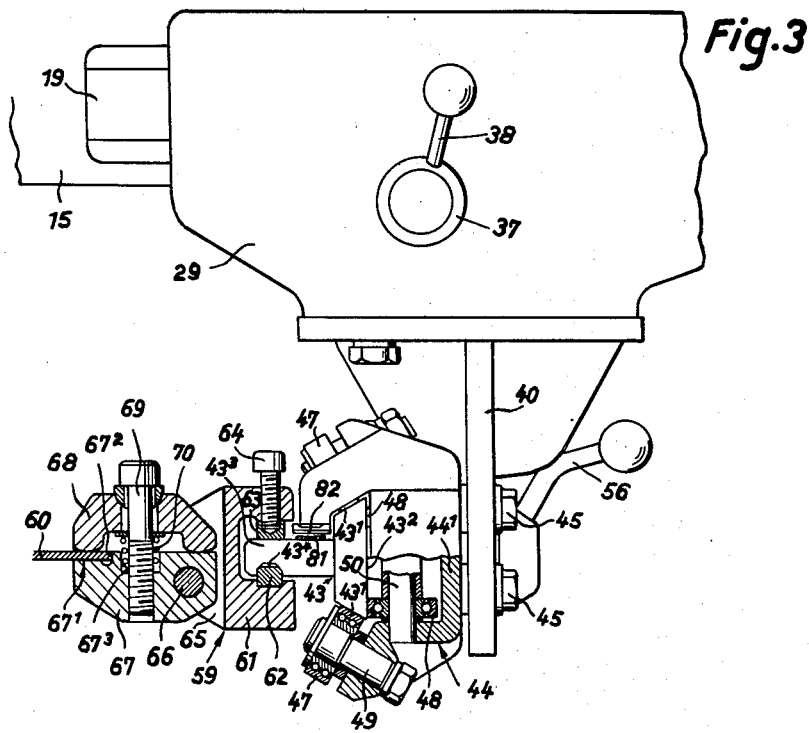
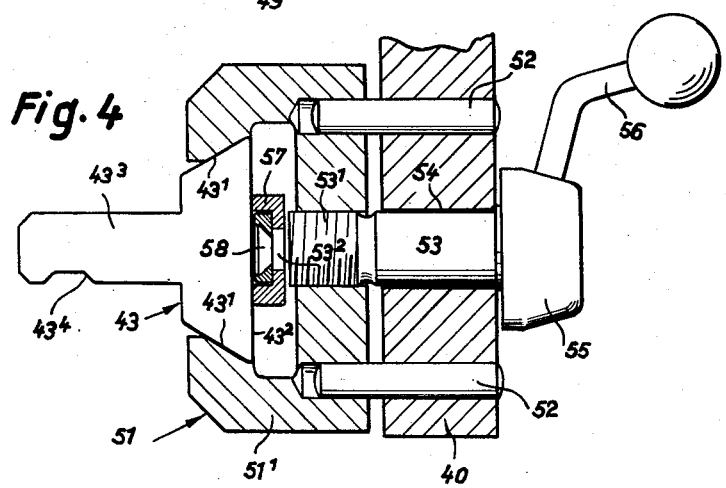
INVENTOR.
Berthold Leibinger
BY
Michael S. Striker
Attorney Dec. 29, 1964  B. LEIBINGER  3,163,068
PUNCH GUIDE FOR NIBBLING MACHINE
Original Filed Oct. 29, 1958  4 Sheets-Sheet 4
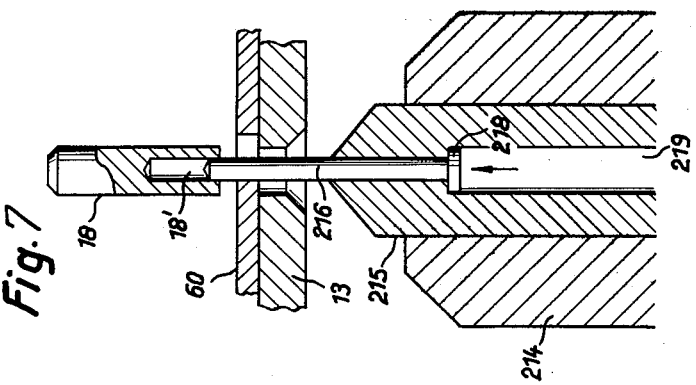
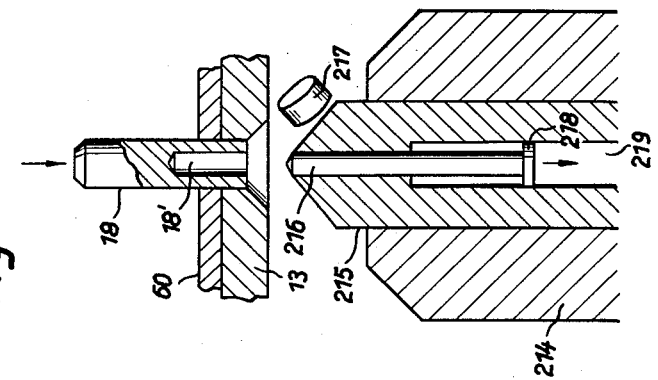
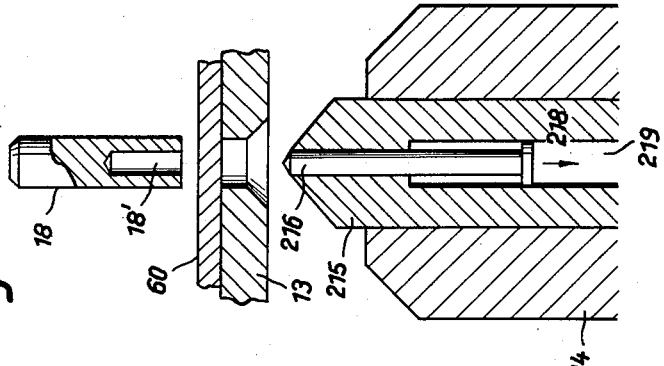
Berthold Leibinger
INVENTOR.
BY Michael S. Striker
Attorney

United States Patent Office 3,163,068
Patented Dec. 29, 1964

3,163,068
PUNCH GUIDE FOR NIBBLING MACHINE
Berthold Leibinger, Stuttgart-Weilimdorf, Germany, assignor to Messrs. Trumpf & Co., Stuttgart-Weilimdorf, Germany
Original application Oct. 29, 1958, Ser. No. 770,461, now Patent No. 3,058,380, dated Oct. 16, 1962. Divided and this application Jan. 12, 1961, Ser. No. 82,199
Claims priority, application Germany, Dec. 6, 1957, T 14,490; July 19, 1958, T 15,410; July 24, 1958, T 15,422
5 Claims. (Cl. 83—237)

The present invention relates to machine tools.

More particularly, the present invention relates to punch presses.

One of the objects of the present invention is to provide a punch press which is capable of cutting from a work sheet material extending along a predetermined path so as to form a slot in the work sheet which, when one of the ends of the slot become joined to each other, provides a sheet portion of predetermined configuration which is cut by the punch press from the work sheet.

It is also an object of the present invention to provide a punch press of the type which will not excessively wear the punch at one side thereof even though this one side of the punch is the side which does most of the work during the advance of the work sheet in a step-by-step manner to enable the punch to cut from the work sheet a portion thereof which will have a predetermined configuration.

In order to prevent excessive wear of the punch, the latter is formed with an axial bore extending inwardly from its bottom end, and a guide pin is carried by the punch press means and extends into this axial bore to guide the punch for axial movement during its cutting of the work sheet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
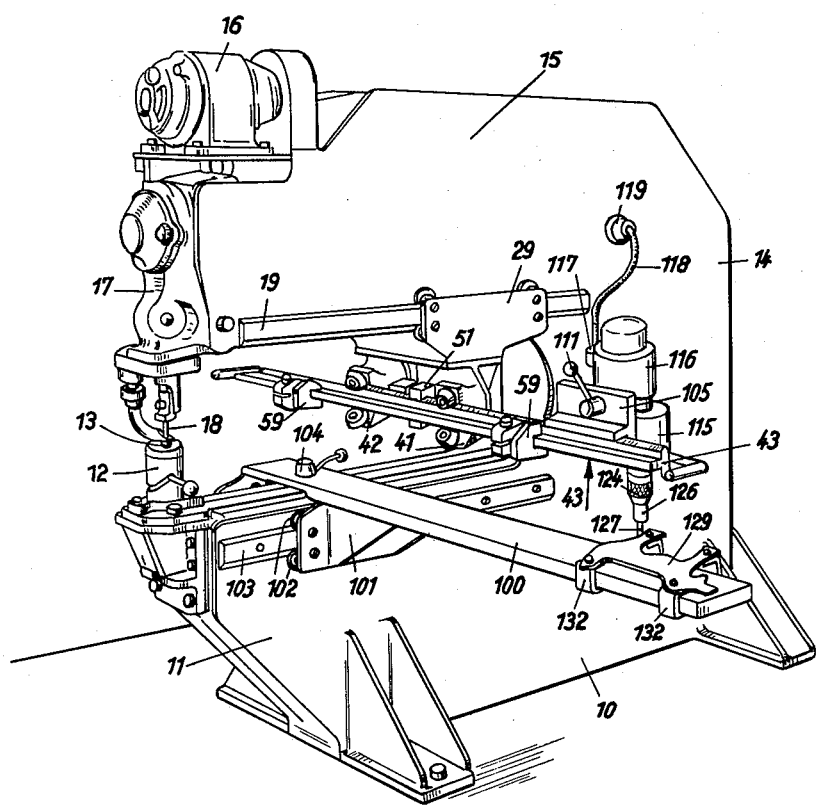
FIG. 1 is a partly schematic perspective view of a machine tool according to the present invention.

FIG. 3 is a fragmentary longitudinal, partly sectional side elevational view showing the longitudinal carriage as it appears from the right side of FIG. 1 and also showing in an end view the transverse carriage which is carried by the longitudinal carriage, FIG. 3 showing partly in section the structure which guides and supports the transversely movable carriage and also showing in section the work holding means which is carried by the transverse carriage;

FIG. 4 is a fragmentary partly sectional elevational view showing the structure for fixing the transversely movable carriage in a given position with respect to the longitudinally movable carriage;

FIG. 5 is a fragmentary schematic sectional elevational view showing a punch guiding structure of the present invention in an inoperative position;

FIG. 6 shows the structure of FIG. 5 after the punch has been moved down to the lowermost part of its stroke so as to cut an opening in a worksheet; and FIG. 7 shows the guide pin of FIGS. 5 and 6 in an operating position cooperating with the punch in order to guide the latter.

Referring now to the drawings, there is shown in FIG. 1 a punch press which includes a supporting frame 10 provided with an elongated lower horizontal arm 11 which carries at its front end a die carrier 12. A die 13 is carried by the die carrier 12 and is removable therefrom in a known way so as to be replaceable with another die. The frame 10 includes a rear portion 14 which serves to support an upper elongated arm 15 of the punch press, this upper arm 15 being parallel to and spaced above the lower arm 11 and also extending substantially horizontally over the lower arm 11. The upper arm 15 carries the driving motor 16 which operates through a suitable transmission 17 on the punch 18 to reciprocate the latter vertically in a known way, this punch 18 being carried by the upper arm 15 adjacent a front end thereof. This punch 18 is, in most cases, of cylindrical cross-section and is capable of cutting along the entire periphery of its bottom end face. Thus, the structure shown in FIG. 1 represents a punch press means which includes the upper arm 115. The lower arm 11, the reciprocable punch 18 carried by the upper arm 15 adjacent a front end thereof and the die 13 carried by the lower arm 11 adjacent a front end thereof beneath the punch 18 so as to cooperate with the latter.

Figure 2:
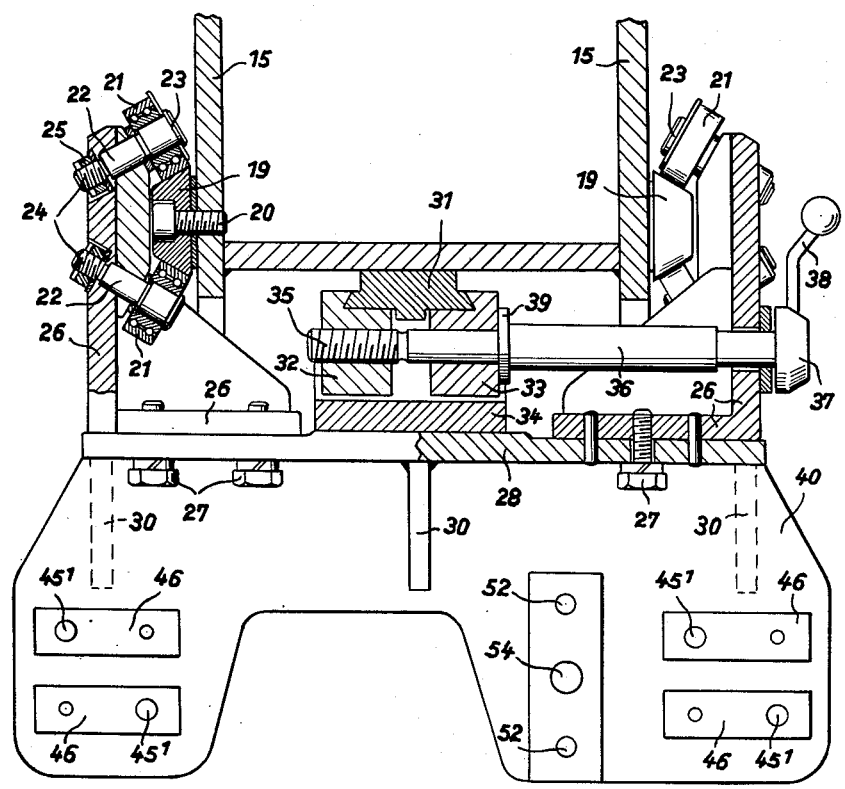
FIG. 2 is a fragmentary transverse sectional view of the structure of FIG. 1 showing the upper arm of the punch press in a transverse sectional view and showing also in a partly sectional transverse view the longitudinally movable carriage means of the present invention.

As may be seen from FIG. 2, the upper arm 15 includes a pair of spaced parallel vertical sidewalls, and a pair of elongated guides 19 are fixed to the exterior surfaces of the side walls of the arm 15 by screws 20 and extend horizontally along the exterior opposed side surfaces of the upper arm 15, in the manner indicated in FIGS. 1 and 2. These guide rails 19 are of trapezoidal cross-section. A plurality of rollers 21 are freely turnable along the oppositely inclined upper and lower faces of each guide rail 19. Each roller 21 is supported by a suitable ball bearing on a pin 22 for free turning movement with respect to the latter, and each pin 22 is provided at its end directed toward the arm 15 with an enlarged head 23 which engages the inner race of the ball bearing to prevent axial movement of this inner race. The opposite end of each pin 22 is provided with a threaded portion 24 so as to threadedly carry a nut 25 for fixing the pin 22 to a wall of an angle iron 26. As is shown at the left portion of FIG. 2, the vertical wall of the angle iron 26 is formed with a bore through which the pin 22 passes, this bore having a shoulder engaged by a shoulder of the pin 22 so as to limit the movement of the pin 22 away from the arm 15, and the nuts 25 serve to fix the pin 22 to the angle irons 26 in the manner shown at the left portion of FIG. 2.

A plurality of screws 27 serve to fix the lower portions of the pair of angle irons located at the opposite sides of the arm 15 to a transverse lower wall 28 which extends beneath the arm 15, so that the angle irons 26 together with the wall 28 form a substantially U-shaped carriage which embraces the lower portion of the arm 15. Thus, this structure forms the longitudinal carriage means 29 which is longitudinally movable along the upper arm 15 toward and away from the punch 18 and which is located in part between the arms 15 and 11. The lower wall 28 of the carriage 29 is provided with stiffening ribs or plates 30.

A suitable means is provided for releasably fixing the longitudinally movable carriage 29 in a desired position along the upper arm 15, and this means includes an elongated rail 31 (FIG. 2) fixed to and extending along the underside of the upper arm 15. This rail 31 has a substantially dovetail cross-section, as shown in FIG. 2, and a pair of gripping members 32 and 33 engage the opposite side edges of the rail 31. These gripping members 32 and 33 are transversely shiftable in a guide member 34 of substantially U-shaped cross-section which is fixed to the top surface of the wall 28 beneath the arm 15. The gripping member 32 if formed with a threaded bore passing therethrough, and an externally threaded pin 35 extends threadedly into this bore. This pin 35 is fixed at its right end, as viewed in FIG. 2, to an elongated spindle 36 which passes freely through a bore of the gripping member 33, and the spindle 36 passes freely through an opening in the vertical wall of the right member 26 of FIG. 2 so as to be accessible at the exterior of the longitudinal carriage 29. At its outer right end, as viewed in FIG. 2, a handle 38 is fixed at its hub 37 to the spindle 36 so that upon turning of the handle 38 the spindle 36 will turn about its axis. The spindle 36 is provided next to the gripping member 33 with an annular flange 39 extending radially from the spindle 36 and pressing with its left face, as viewed in FIG. 2, against the gripping member 33. Thus, by turning the spindle 36 in one direction the gripping members 32 and 33 may be drawn toward each other so as to tightly grip the rail 31 for fixing the carriage 29 in a predetermined longitudinal position along the upper arm 15, while turning of the spindle 36 in the opposite direction will cause the gripping members 32 and 33 to move apart from each other so as to release the carriage 29 for movement longitudinally along the upper arm 15. The guide 34 for the gripping members 32 and 33 not only guides them for movement toward and away from each other, but this guide member 34 acts additionally to prevent turning of the gripping members 32 and 33.

A substantially vertical carrier wall 40 extends transversely with respect to the arm 15 across the underside of the plate 28 and is fixed to the latter. It will be noted from FIG. 2 that one stiffening plate 30 is located in front of the plate 40, while the other two stiffening plates are located to the rear of the plate 40, and the latter may be fixed to the underside of the wall 28 in any suitable way as by being welded thereto, for example. Also, the plates 30 may be fixed to the underside of the wall 28 as by being welded thereto, for example. As may be seen from FIG. 1, this carrier wall 40 carries a pair of guide means 41 and 42 which serve to support and guide a transverse carriage 43 for transverse movement with respect to the longitudinal carriage 29. Thus, the transverse carriage 43 is carried by the longitudinal carriage 29 for movement with the latter longitudinally of the arm 15, and at the same time the carriage 43 is movable transversely of the carriage 29 and the arm 15.

Each of the bearing means 41 and 42 includes a substantially U-shaped member 44 (FIG. 3) which is fixed to the front face of the carrier wall 40. The vertical wall 44' of the member 44 is fixed by the screws 45 to the wall 40, these screws 45 extending respectively through the openings 45' formed in the wall 40 (FIG. 2). At its front face the wall 40 has protections thereof which are machined so as to provide the smooth surfaces 46 which are very precisely positioned for receiving the members 44 so as to accurately position the latter. The upper and lower portions of each U-shaped member 44 serve to support the rollers 47 and 48 which cooperate with the transverse carriage 43 to guide the latter.

This transverse carriage 43 is made of an elongated bar of substantially T-shaped cross-section, and the rear vertical wall of this bar (FIGS. 3 and 4) is formed with a pair of oppositely inclined upper and lower surfaces 43' so that the rear wall of the T-bar has a substantially dovetail cross-section. The upper and lower rollers 47 are suitably inclined so as to cooperate with the surfaces 43', respectively, for guiding the transverse carriage 43. These rollers 47 are respectively carried by pins 49 in the manner shown most clearly at the lower portion of FIG. 3, and these pins 49 are fixed to the upper and lower edge portions of each member 44. The guide rollers 48 engage the rear face 43$^2$ of the rear wall of the carriage 43, and these rollers 48 are carried by a vertical pin 50 which is in turn carried by the member 44 in the manner shown in FIG. 3 and serve to turnably support the rollers 48.

The carriage 43 is easily movable along the above-described guide means transversely of the carriage 29 and the arms 15 and 11. The carriage 29 carries a device 51 (FIG. 4) which serves as a means for releasably fixing the transverse carriage 43 in any desired position with respect to the carriage 29. Thus, as may be seen from FIG. 4, the device 51 includes a substantially U-shaped gripping member 51' which is supported by guide pins 52 for movement toward and away from the wall 40. These guide pins 52 are fixed to the wall 40 and extend substantially horizontally in a direction perpendicularly therefrom into mating bores of the member 51 which respectively slidably receive the guide pins 52 in a manner shown in FIG. 4. At its free left ends, as viewed in FIG. 4, the clamping member 51' is provided with inclined surfaces which are respectively inclined in the same way as and engage the surfaces 43' of the carriage 43. A spindle 53 of the device 51 extends freely through a bore 54 of the wall 40, and at the rear face of the wall 40 the spindle 53 is fixed to a hub 55 of a handle 56 which may be turned by the operator in order to turn the spindle 53. At its portion which extends forwardly from the wall 40 the spindle 53 is provided with a thread 53' which threadedly cooperates with a threaded bore of the clamping member 51'. The spindle 53 has an extension 53$^2$, and this extension has a smaller diameter than the threaded portion 53' of the spindle 53. This extension of the spindle extends into an opening of a pressure member 57 which is freely turnable on the extension 53$^2$ of the spindle 53. A screw member 58 is threaded into the spindle 53 from its left end, as viewed in FIG. 4, and a suitable washer is located between the head of the screw member 58 and the pressure member 57 as indicated in FIG. 4, so that in this way the pressure member 57 is carried by the spindle 53 after the latter is passed through the aligned bores of the wall 40 and the clamping member 51'. When the handle 56 is turned in one direction, the spindle 53 will be turned so as to thread the portion 53' thereof into the clamping member 51', and since the latter cannot turn as a result of the cooperation of the guide pins 52 with the member 51', the latter will be drawn toward the wall 40 so as to cause the clamping member 51 to clamp tightly against the upper and lower faces of the rear wall of the carriage 43. Continued turning of the spindle 53 in this direction will cause the pressure member 57 to press against the rear face of the transverse carriage 43, and in this way the rear wall of the carriage 43 is tightly clamped between the member 51', on the one hand, and the pressure member 57, on the other hand, and thus it is possible to fix the transverse carriage 43 in any desired position with respect to the carriage 29, as when it is desired to advance the work only longitudinally. When the spindle 53 is turned by the operator in the opposite direction the device 51 is actuated so as to release the transverse carriage 43 for free movement with respect to the longitudinal carriage 29.

The transverse carriage 43 carries a holding means which serves to support the work sheet in a predetermined plane while it is being acted upon by the punch press so that this work sheet can be moved in all directions in this plane. For this purpose the forwardly extending horizontal wall 43$^3$ of the carriage 43 is formed in its underside with an elongated groove 43$^4$ extending longitudinally along the carriage 43 and having a substantially trapezoidal cross-section, as indicated in FIG. 4. The work holding means includes a pair of devices 59 which are identical with each other and spaced from each other along the carriage 43, as shown in FIG. 1. The details of each of the devices 59 is indicated in FIG. 3. Thus, each device 59 includes a substantially U-shaped member 61 which embraces the front free edge of the carriage 43. The lower portion of each member 61 is formed with an upwardly directed recess which receives a slide block 62 which is fixed in this way to each member 61, and the slide block 62 is slidable along the lower groove formed in the horizontal wall of the carriage 43. Between the upper portion of each member 61 and the horizontal wall of the carriage 43 is a pressure member 63 which is engaged by the bottom end of a screw 64 extending threadedly through the upper portion of the member 61, and thus by tightening the screw 64 it is possible to fix the member 61 of each device 59 at a desired position along the carriage 43 for movement with the latter.

Each member 61 is provided with a pair of forwardly extending spaced side walls 65 which carry a horizontal pivot pin 66 which extends across the space between the side walls 65. A gripping means is turnably supported by the pivot pin 66, and this gripping means has a lower portion 67 extending into the space between the walls 65 and formed with a bore through which the pivot pin 66 passes so that the member 67 is freely turnable about the horizontal axis of the pivot pin 66. This gripping means includes in addition to the lower part 67 and upper gripping jaw 68 formed with a bore through which a bolt 69 passes, this bolt 69 having a lower threaded portion which cooperates threadedly with a threaded bore of the lower gripping member 67. As is apparent from FIG. 3, the head of the bolt 69 cooperates with a suitable washer which bears against the upper gripping member 68, and a spring 70 is coiled about the bolt 69 and bears against a washer which is urged by the spring 70 against the upper member 68 and also against a shoulder formed in an enlarged portion $67^3$ of the threaded bore of the member 67. Thus, the spring 70 will urge the jaws of the gripping device 67, 68 apart from each other when the screw 69 is loosened. It will be noted from FIG. 3 that the lower jaw member 67 is provided with substantially perpendicular plane surfaces $67'$ and $67^2$ which respectively engage surfaces of the work sheet 60 which may be sheet metal, for example. Thus, the vertical surface $67^2$ forms a stop which cooperates with an edge of the work sheet to precisely determine the position of the work sheet with respect to the work holding means.

The structure of the invention includes a third carriage 100 which is longitudinally movable along the lower arm 11 of the punch press means. This carriage 100 includes a supporting portion 101 which is guided by rollers 101 for movement longitudinally along the rails 103 in the same way that the carriage 29 is supported by the rollers 21 for movement along the rails 19, so that the details of the structure which supports the carriage 100 need not be described, this structure having the same details as the structure shown in FIG. 2 for the carriage 29. The carriage 100 is additionally provided with a releasable clamping device 104 of any suitable construction for releasably fixing the carriage 100 in any desired position along the lower arm 11.

The carriage 100 serves to support a template 129 which through a suitable structure cooperates with the carriages 29 and 43 for automatically moving a work sheet 60 while it is being acted upon by the punch 18 and the die 13 so as to cause the punch 18 and the die 13 to cut from the work sheet a portion thereof which will leave a work sheet portion having a configuration corresponding to that of the template. The structure for automatically controlling the carriages 29 and 43 in this manner is more clearly described in the copending application Serial Number 770,461, now Patent 3,058,380, of which the present application is a divisional application.

This structure for automatically moving the carriages includes a base member 105 formed with a substantially dovetail slot which receives the rear wall of the carriage 43 so that the entire structure for controlling the carriages is carried by the transverse carriage 43.

The base member carries a transmission housing 115 which houses an unillustrated transmission providing a gear reduction for the drive from a motor 116 carried by the housing 115. The electric motor 116 has its exterior housing connected to an enclosure 117 for the electrical leads of the motor which are connected with the cable 118 which is connected to and extends from the enclosure 117, and this cable 118 is provided at its end distant from the motor 116 with a plug 119 cooperating with a socket carried by the machine in a manner shown in FIG. 1 and connected in any suitable way with a source of electrical current for supplying the motor 116.

The bottom wall of the transmission housing 115 is formed with an opening through which the drive shaft of the transmission passes, which carries feed roller means 124, 126, 127 which cooperate with the template 129 and another template not shown in the drawings for controlling movement of the carriages 29 and 43 in the manner as described in the aforementioned parent application.

As is apparent from the above description, only a part of the cutting edge of the punch 18 is used once the elongated slot has been started in the work sheet. Moreover, due to the continuous feeding of the work sheet in a given direction with respect to the punch, the work sheet tends to bend the punch out of alignment with the die, and as a result both the punch and the die will become rapidly worn. In order to overcome this disadvantage the structure shown in FIGS. 5–7 is provided. As may be seen from FIGS. 5–7, the punch 18 is formed with an axial bore $18'$ extending upwardly from its bottom cutting end. The work sheet 60 is shown beneath the punch 18 resting on the die 13 which is supported in a known way. A lower stationary part 214 which is carried by the arm 11 at its front end serves to support a cylindrical member 215 which guides for axial movement a guide pin 216. The top portion of the guide or holder 215 is formed with an axial bore through which the pin 216 is axially slidable, and beneath this top portion the guide 215 is formed with an axial bore 219 of a larger diameter in which an enlarged portion 218 of the pin 216 is slidable, this portion 218 forming a piston which is slidable in the cylindrical bore 219 of the guide member 215.

The guide pin 216 has a diameter smaller than that of the punch 18 and is adapted to extend slidably into the axial bore $18'$ thereof. This guide pin 216 is shown in its operating position in FIG. 7. As may be seen from FIG. 7, the guide pin 216 extends with clearance through the opening of the die 13 into the bore $18'$, so that during the vertical reciprocating movement of the punch 18 between the positions shown in FIGS. 6 and 7, the guide pin 216 will prevent any tendency of the punch to bend out of alignment with the opening of the die 13, as a result of the feeding movement of the work sheet 60, and in this way rapid wear of the punch and die will be avoided. Of course, the guide pin 216 is coaxial with the punch 18.

FIG. 5 illustrates the position of the parts at the start of the operation. At this time, the guide pin 216 is retracted to an idle position shown in FIG. 5 where the guide pin 216 does not project upwardly beyond the guide cylinder 215. At this time the punch 18 is free to move down to the position shown in FIG. 6 so as to cut from the work sheet a portion 217 indicated in FIG. 6, and it will be noted that this retraction of the guide pin 216 to the idle position shown in FIGS. 5 and 6 locates the guide 216 out of the way of the member 217 so that the latter is free to fall. After this first opening is formed in the work sheet, the guide pin 216 is raised to its upper position shown in FIG. 7, so that it extends upwardly beyond the die and the work sheet into the bore $18'$ and is located in the bore $18'$ even when the punch is at the top of its stroke.

As is apparent from FIG. 7, the guide pin 216 will not only guide the punch 18 so as to counteract any tendency of the work to press against one side of the punch so as to bend the latter out of alignment with the die, but in addition this guide pin 216 will engage an edge of the opening formed in the work sheet 60 so as to limit the advance of the work sheet 60 and thus limit the amount of material cut from the work sheet during each cutting stroke of the punch 18. The portions of the material cut away from the work sheet 60 while the guide pin 216 is in the operating position thereof shown in FIG. 7 can fall freely downwardly alongside of and beyond the elements 214 and 215.

Any suitable structure may be provided for raising and lowering the guide pin 216. For example, it may be raised and lowered by hand, or a suitable pull wire may be provided for this purpose. Also, any electrical structure may be provided to raise and lower the guide pin 216. In the illustrated example the guide pin 216 is raised and lowered either hydraulically or pneumatically. Thus, a suitable pressure fluid may be located within the cylindrical opening 219 beneath the piston 218, and through suitable valves this pressure fluid may be admitted for raising the guide pin 216 from the position of FIGS. 5 and 6 to that of FIG. 7, and the pressure may be reduced for retracting the guide pin back to the rest position thereof shown in FIGS. 5 and 6.

It will be understood that each of the elements described above, or two or more together, may also find a useful application in other types of machine tools differing from the types described above.

While the invention has been illustrated and described as embodied in punch presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a punch press, in combination, a die formed with an opening passing therethrough; a punch having a rest position to one side of said die and being axially reciprocable into and out of said opening and having an end portion adapted to extend into said die during cutting of a work sheet fed between punch and die, said punch being formed in said end portion thereof with an axial bore extending from the end face of said punch located at the termination of said end portion thereof; an elongated guide pin extending slidably into said bore of said punch for guiding the latter during reciprocation thereof; and support means spaced from the other side of said die and supporting said guide pin for movement between an operating position where it extends into said bore of said punch to guide the latter during its reciprocation and to limit feeding of the work sheet and an idle position where it is spaced sufficiently from said punch and die on the side of said die opposite from said punch to be out of the way of material cut by said punch so that the material can freely fall to permit punching of a starting hole in said work sheet.

2. In a punch press, in combination, an elongated stationary guide cylinder; an elongated guide pin axially movable in said cylinder between an operating position where an elongated portion of said guide pin extends beyond said cylinder and an idle retracted position where said guide pin is retracted into said cylinder; a punch coaxial with said guide pin and being formed with an axial bore into which said guide pin extends slidably with respect to said punch when said guide pin is in said operating position thereof so that said guide pin guides said punch for axial reciprocating movement; and a die formed with a bore which cooperates with said punch and through which said guide pin extends with clearance, said guide pin being movable between said positions thereof independent from the reciprocating movement of said punch, so that said guide pin may be moved to said idle position thereof while said punch reciprocates to permit punching of a starting hole in a work sheet fed between punch and die.

3. In a punch press, in combination, an elongated stationary guide cylinder; an elongated guide pin axially movable in said cylinder between an operating position where an elongated portion of said guide pin extends beyond said cylinder and an idle retracted position where said guide pin is retracted into said cylinder; a punch coaxial with said guide pin and being formed with an axial bore into which said guide pin extends slidably with respect to said punch when said guide pin is in said operating position thereof so that said guide pin guides said punch for axial reciprocating movement; and a die formed with a bore which cooperates with said punch and through which said guide pin extends with clearance, said guide pin, when in said operating position, serving as a limiting means for limiting the feeding of a work sheet during the step by step advance thereof between strokes of the punch, said guide pin being movable between said positions thereof independent from the reciprocating movement of said punch, so that said guide pin may be moved to said idle position thereof while said punch reciprocates to permit punching of a starting hole in a work sheet fed between punch and die.

4. In a nibbling machine, in combination, support means; a die mounted on said support means and being formed with a die opening; an elongated punch having a longitudinal axis and being mounted on said support means axially aligned with the die opening and reciprocatable in axial direction to cooperate with said die for cutting a slot in a work sheet fed transverse to said axis between die and punch during reciprocation of the latter, said punch being formed with a bore extending in axial direction; means operatively connected to said punch for reciprocating the same along its axis between a first end position in which the punch is located to one side of the work sheet fed between punch and die and a second end position in which part of said punch extends through the work sheet into the die opening; means tending to feed a work sheet between punch and die continuously in a direction transverse to said axis, said feeding means feeding said work sheet when said punch is in said first end position while said work sheet will exert a bending pressure on said punch during the movement thereof between said end positions when said punch is in engagement with said work sheet; a guide pin coaxial with said bore in said punch and extending with ample clearance through said die opening and with a slide fit into said bore for guiding the punch during reciprocation thereof and for preventing bending of the punch out of alignment with the die opening by the pressure exerted by the work sheet, said guide pin also limiting the feed movement of said work sheet when said punch is in said first end position; and means supporting said guide pin movable from the position in which the pin extends through the die opening into the bore of said punch to a retracted position in which said pin is withdrawn from said bore and said die opening and sufficiently spaced from the die to permit at the start of the nibbling operation punching of a single slug out of the work sheet having a cross section equal to that of said die opening and ejection of said slug through the die.

5. An arrangement as defined in claim 4 in which said means for supporting said guide pin is formed with a stepped bore having adjacent said die a first bore portion of smaller diameter than a second portion of said stepped bore further spaced from said die than said first portion, in which said guide pin slidingly fits in said first bore portion and in which said guide pin has an enlarged portion forming a piston in said second bore portion of enlarged diameter, whereby by feeding pressure fluid into and out of said second bore portion said guide pin may be moved between the positions thereof.

References Cited by the Examiner
UNITED STATES PATENTS

| | | | |
|---|---|---|---|
| 1,320,189 | 10/19 | Wilson | 83—916 |
| 1,459,320 | 6/23 | Corset | 83—391 |
| 2,035,448 | 3/36 | Andersson | 83—395 |
| 2,145,725 | 1/39 | Jamieson | 83—685 |
| 2,557,797 | 6/51 | Rand | 83—451 |
| 2,699,830 | 1/55 | Hodge | 83—637 |

ANDREW R. JUHASZ, *Primary Examiner.*

WILLIAM W. DYER, JR., CARL W. TOMLIN,
*Examiners.*